June 10, 1924.

C. W. WILLIAMS, JR 1,497,352

VEHICLE SAFETY DEVICE

Filed Dec. 6, 1923

Charles W. Williams, Jr., Inventor

By his Attorney

Chas. W. Mortimer

June 10, 1924.

C. W. WILLIAMS, JR 1,497,352

VEHICLE SAFETY DEVICE

Filed Dec. 6, 1923

Charles W. Williams, Jr Inventor

By his Attorney Chas. W. Mortimer

Patented June 10, 1924.

1,497,352

UNITED STATES PATENT OFFICE.

CHARLES W. WILLIAMS, JR., OF MONTCLAIR, NEW JERSEY.

VEHICLE SAFETY DEVICE.

Application filed December 6, 1923. Serial No. 678,832.

*To all whom it may concern:*

Be it known that I, CHARLES W. WILLIAMS, Jr., a citizen of the United States, residing at 1 Rydal Place, Montclair, in the county of Essex and State of New Jersey, have invented certain new and useful Improvements in Vehicle Safety Devices, of which the following is a specification.

This invention relates to a device that may be attached to an automobile or other vehicle to render the same more safe for pedestrians and to aid in the avoidance of fatal accidents.

One of the objects of this invention is to prevent a pedestrian from being run over or being mortally injured when struck by an automobile or other moving vehicle.

Another object is to provide a safety fender that will occupy a relatively small space in its normal or closed position and at the same time will not present an unsightly appearance or interpose an excessively large surface to cause an increase in the amount of the air resistance.

Another object is to provide a lever or a system of levers for operating the safety device which levers may also serve as a bumper for the car to which the device is attached.

The invention will be understood from the description in connection with the accompanying drawings in which, Fig. 1 is a side view of the device;

Figure 1:
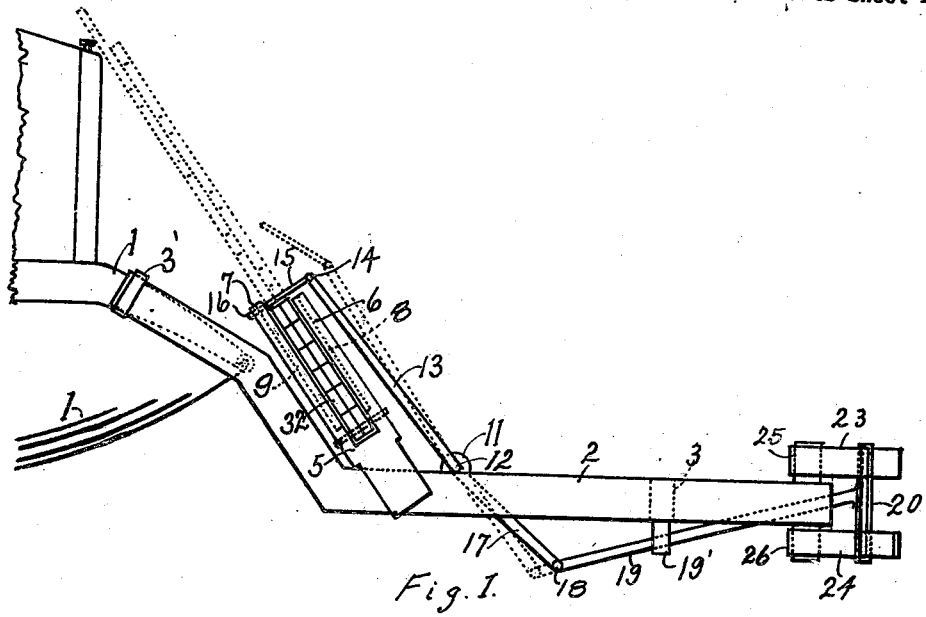
Figure 2:
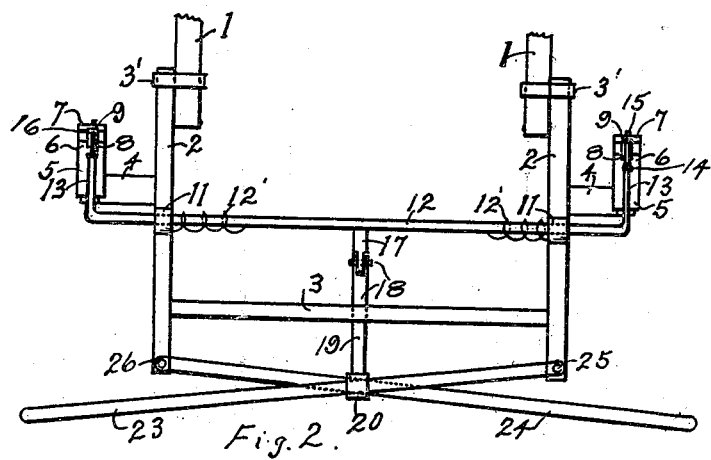
Fig. 2 is a plan view of the same with parts removed.
Figure 3:
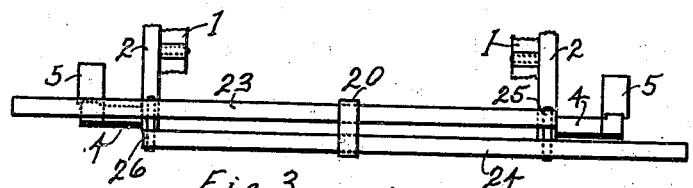
Fig. 3 is an end view.

In the drawings, reference character 1 indicates the front springs or other portion on the front of a vehicle. The supports 2 may be attached to the springs 1 in any suitable manner as, for example, by means of the straps 3'. These supports 2 extend forwardly and downwardly and outwardly so as to be at a proper height from the ground and a steadying or strengthening bar 3 joins them near their outer ends. Projections 4 extend laterally outwardly from the sides of the supports 2 and upon the outer end of these projections are mounted guides 5 for an expansible frame or safety device that will be described more in detail below. The guides 5 have two sides 6 and 7 with a space therebetween in which the expansible frame to be described later is mounted. The sides 6 and 7 of the guide 5 are provided along their inner sides with longitudinal grooves or channels 8 and 9 in which the ends of pivots in the expansible frame are to be guided.

The supports 2 are provided along their upper edges with bearings 11 in which bearings a rod 12 is mounted. This rod 12 is surrounded by springs 12', one end of each of these springs being attached to the rod 12 and the other ends to the supports 2 so as to tend to turn the rod 12 in an anti-clockwise direction, as seen in Fig. 1. The rod 12 has its outer ends 13 extending upwardly and these ends are connected by means of the pivots 14 to the catches 15 which are caused by the springs 12' to project through holes 16 in the sides 7 of the guides 5. An arm 17 projects downwardly from near the middle portion of the rod 12 and is attached by means of the pivot 18 to the bar 19 which is at its front end rigidly attached to a strap or loop 20 and extends through a hole in a projection 19' on bar 3. The loop 20 surrounds or embraces the levers 23 and 24. The lever 23 is pivoted at 25 upon the outer end of one of the supports 2 and the lever 24 is similarly pivoted at 26 upon the outer end of the other support 2 and the levers 23 and 24 cross each other at the loop 20 and their outer ends project beyond the outside of the supports 2 and the pivots 25 and 26 are made long enough so that each one will be struck by the other lever than the one that is pivoted thereto when the same are turned in that direction.

Figure 4:
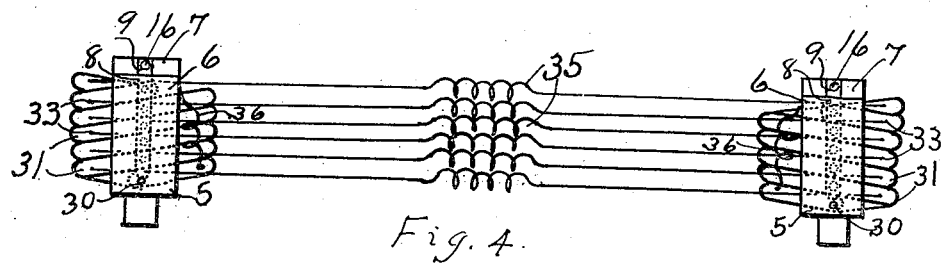
Fig. 4 is a plan view of a portion of the device.
Figure 5:
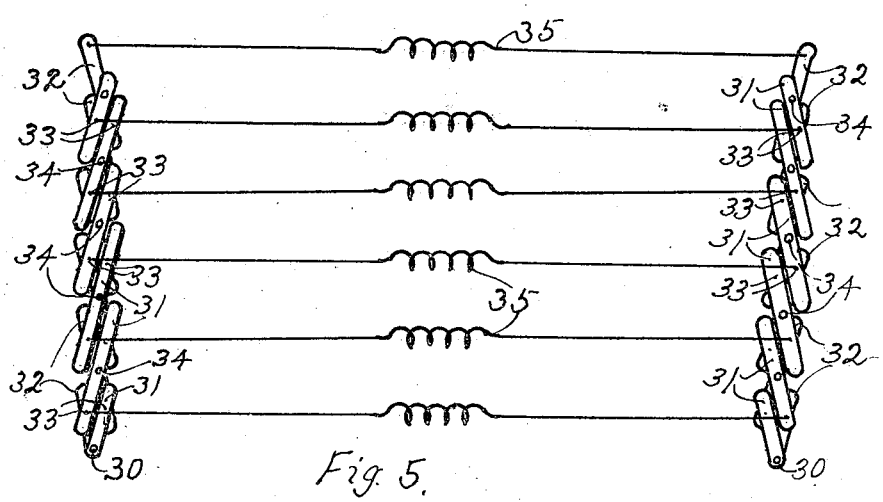
Fig. 5 is a similar view showing the device in its open or expanded position.

Referring more particularly to Figures 4 and 5 it will be seen that a collapsible frame work or safety device is made up of two sets of pivoted levers that are mounted in the guides 5 and are connected by a series of springs. Each side of the expansible frame comprises two series of parallel levers 31 and 32 which are pivoted together at 33 somewhat near their outer ends and also at 34 at their middle portions as shown more clearly in Fig. 5. A pivot 30 at the lower ends thereof pivots the first two levers 31 and 32 together and this pivot is longer than the others and extends outwardly through the sides of the guides 30 and serves to anchor the sides of the frame in the guides. The ends of the pivots 33 are flush with the sides of the levers 31 and 32 so that they freely slide up and down in the space between the sides 6 and 7 of the guides 5, while the pivots 34 extend slightly beyond the sides of the levers 31 and 32 and their ends slide up and down in the grooves or channels 8 and 9 on the inside of the sides 6 and 7 of the guides 5. The outer pivots 33 are connected by means of tensile springs 35 which thereby tends to keep the frame expanded and other springs 36 may be attached to the guides 5 and the ends of the lower pivots 31 to aid in expanding the frame.

The operation is as follows: In the normal position of the device the frame will be collapsed as indicated in Fig. 1 with the catch 15 extending over the edges of the frame and retaining the same in its collapsed position with the free ends of the levers 23 and 24 extending slightly in front of the pivots or stops 25 and 26. In case an object is struck by means of the levers 23 or 24, these levers will be turned backwards until they strike the pivots 25 or 26 thus causing these levers to serve as a bumper and at the same time the rod 19 through the arm 17 will turn the rod 12 and cause the upturned ends 13 thereof to withdraw the catches 15 from the holes 16 in the sides 7 thus permitting the springs 35 and 36 to expand the frame into the position indicated in Fig. 5 whereupon the springs 35 will act as a cushion or catch upon which the victim will fall without injury. The ends of the frame work or safety device may, if desired, be caused to rest upon or be supported by the mudguards when the frame work is in its expanded position. I may add wires or similar devices between supports 2 which may be parallel with bar 3, the ends thereof being connected to supports 2. It will be understood that the weight of the levers 23 and 24 will normally by pressing downwardly on the end of the bar 19 aid in retaining the ends of the catches 15 extended into the holes 16, but when the lever 23 or lever 24 is pushed backward the bar 19 slides in the hole in extension 19′ and the catches 15 are withdrawn from the holes 16.

What I claim and desire to secure by Letters Patent is:

1. In a motor vehicle safety device, supports adapted to be attached to the front of the vehicle, an expansible frame carried by said supports, said frame comprising levers pivoted together and mounted in guides, said guides having longitudinal grooves therein in which the ends of certain pivots of said frame slide and means to hold said frame in its collapsed position and to release the same upon contact with an object.

2. In a motor vehicle safety device, supports adapted to be attached to the front of the vehicle, an expansible frame carried by said supports, said frame comprising levers pivoted together and mounted in guides, said guides having longitudinal grooves therein in which the ends of certain pivots of said frame slide and a catch to hold said frame in its collapsed position and means to release said catch when an object is struck.

3. In a motor vehicle safety device, supports adapted to be attached to the front of the vehicle, an expansible frame carried by said supports, said frame being mounted in guides, a catch to hold said frame in its collapsed position and two levers pivoted to said supports and adapted to release said catch.

4. In a motor vehicle safety device, supports adapted to be attached to the front of the vehicle, an expansible frame carried by said supports, said frame being mounted in guides, a catch to hold said frame in its collapsed position and means mounted on the forward end of said supports and adapted to release said catch when urged in the direction of said frame.

5. In a motor vehicle safety device, supports adapted to be attached to the front of the vehicle, an expansible frame carried by said supports, said frame being mounted in guides, and means to hold said frame in its collapsed position and to release the same upon contact with an object, the sides of said frame being connected by springs.

6. In a motor vehicle safety device, supports adapted to be attached to the front of the vehicle, an expansible frame carried by said supports, said frame being mounted in guides having channels, and means to hold said frame in its collapsed position and to release the same upon contact with an object, and the ends of said frame being guided in said channels.

7. In a device of the class described, two guides, expansible frames mounted in said guides and connected by springs tending to expand them.

8. In a device of the class described, two guides, two series of parallel bars pivoted together and mounted in each guide and springs connecting said series of bars.

9. In a device of the class described, two guides, a set of pivoted bars mounted in each guide, and means tending to pull said sets toward each other.

10. In a device of the class described, two guides having longitudinal channels, pivoted bars mounted in said guides, the ends of the pivots being in said channels.

11. In a device of the class described, two guides having longitudinal channels, pivoted bars mounted in said guides, the ends of the pivots being in said channels and one of said pivots extending through the sides of said guides.

In testimony whereof I affix my signature.

CHARLES W. WILLIAMS, Jr.